AUGUST DOEPP, OF NEWARK, NEW JERSEY.

Letters Patent No. 84,096, dated November 17, 1868.

IMPROVED COMPOUND FOR TREATING LEATHER.

The Schedule referred to in these Letters Patent and making part of the same.

*To all whom it may concern:*

Be it known that I, AUGUST DOEPP, of Newark, in the county of Essex, in the State of New Jersey, have invented a new and improved Compound for Treating Leather; and I do hereby declare the following to be a full, clear, and exact description thereof, which will enable those skilled in the art to make and use the same.

This invention is based on the discovery that the oleate of glyceryl, a substance which is obtained in large quantities as a refuse in the manufacture of stearine, has the property to render leather of any kind soft and pliable, and to increase materially the durability and strength thereof.

The effect of the oleate of glyceryl on the leather is improved by the addition of oil of tar, and in most cases it is desirable to add to it an aromatic substance, such as nitro-benzine, whereby its pungent odor is counteracted.

The compound, which I have found to be of good effect, and which I have prepared as a marketable article, is mixed together as follows:

Oleate of glyceryl, one gallon.
Oil of tar, one-half pint.
Nitro-benzine, one ounce.

The oleate of glyceryl, as obtained in the manufacture of stearine, should be freed as much as possible from stearine still mixed with it, by decanting in a low temperature.

By the action of the oil of tar, the oleate of glyceryl is, to a great extent, deodorized, and it is also rendered more liquid, so that the same can be readily applied to the leather.

The nitro-benzine, I add merely to impart to my compound an agreeable flavor, and this material can be replaced by any other suitable aromatic liquid or substance.

In applying my compound, I heat the same to about 110°, (more or less,) and spread it on the surface of the leather with a brush, or any other suitable means. If the leather is old and hard, I clean and soften it with hot water, and immediately I apply my compound.

Having thus described my invention,

What I claim as new, and desire to secure by Letters Patent, is—

A compound for treating leather, the chief ingredient of which is oleate of glyceryl, as set forth.

AUGUST DOEPP.

Witnesses:
GEORGE W. SCHMITT,
JOHN ROSE.